US010045163B2

United States Patent
Zhang et al.

(10) Patent No.: US 10,045,163 B2
(45) Date of Patent: Aug. 7, 2018

(54) METHODS AND APPARATUSES FOR CONTROLLING A WIRELESS ACCESS POINT

(71) Applicant: Xiaomi Inc., Beijing (CN)

(72) Inventors: Yanlu Zhang, Beijing (CN); Mingjun Yin, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 92 days.

(21) Appl. No.: 15/075,852

(22) Filed: Mar. 21, 2016

(65) Prior Publication Data
US 2016/0295378 A1    Oct. 6, 2016

(30) Foreign Application Priority Data

Mar. 31, 2015   (CN) .......................... 2015 1 0149483

(51) Int. Cl.
| | |
|---|---|
| *H04W 4/06* | (2009.01) |
| *H04W 84/10* | (2009.01) |
| *H04W 48/00* | (2009.01) |
| *H04W 88/12* | (2009.01) |
| *H04W 88/08* | (2009.01) |

(52) U.S. Cl.
CPC ............. *H04W 4/06* (2013.01); *H04W 84/10* (2013.01); *H04W 48/00* (2013.01); *H04W 88/08* (2013.01); *H04W 88/12* (2013.01)

(58) Field of Classification Search
CPC ....... H04W 4/06; H04W 84/10; H04W 88/08; H04W 88/12; H04W 48/00
See application file for complete search history.

(56) References Cited

U.S. PATENT DOCUMENTS

| | | | |
|---|---|---|---|
| 2012/0233679 A1* | 9/2012 | Shedrinsky | G06F 19/327 726/7 |
| 2012/0264474 A1 | 10/2012 | Joh et al. | |
| 2014/0044113 A1 | 2/2014 | Chu | |
| 2014/0119298 A1* | 5/2014 | Jeon | H04W 76/11 370/329 |

(Continued)

FOREIGN PATENT DOCUMENTS

| | | |
|---|---|---|
| CN | 101640942 A | 2/2010 |
| CN | 101959321 A | 1/2011 |

(Continued)

OTHER PUBLICATIONS

Extended European Search Report received from European Patent Office for European Application No. 16156560.1, dated Aug. 8, 2016 (6 pages).

(Continued)

*Primary Examiner* — Min Jung
(74) *Attorney, Agent, or Firm* — Finnegan, Henderson, Farabow, Garrett & Dunner LLP

(57) ABSTRACT

A method for controlling a wireless access point includes detecting that a control event relating to a smart device is triggered, acquiring a service set identifier (SSID) corresponding to the control event, generating a Wireless Fidelity (Wi-Fi) broadcast message according to the SSID corresponding to the control event, and broadcasting the Wi-Fi broadcast message, such that the smart device enables the wireless access point according to the Wi-Fi broadcast message.

9 Claims, 5 Drawing Sheets

(56) References Cited

U.S. PATENT DOCUMENTS

| | | | |
|---|---|---|---|
| 2014/0219148 A1* | 8/2014 | Zhao | H04W 52/0229 370/311 |
| 2014/0250513 A1 | 9/2014 | Cao et al. | |
| 2015/0065088 A1* | 3/2015 | Wu | H04B 5/0031 455/411 |
| 2015/0071216 A1 | 3/2015 | Ilsar et al. | |
| 2015/0110092 A1* | 4/2015 | Bae | H04W 4/70 370/338 |
| 2015/0332586 A1* | 11/2015 | Hamm | G08C 17/02 340/12.5 |
| 2015/0334284 A1* | 11/2015 | Fukushima | H04W 76/10 348/211.2 |
| 2016/0037436 A1* | 2/2016 | Spencer | H04W 48/12 370/338 |

FOREIGN PATENT DOCUMENTS

| | | |
|---|---|---|
| CN | 103442351 A | 12/2013 |
| CN | 103442410 A | 12/2013 |
| CN | 103529793 A | 1/2014 |
| CN | 103648181 A | 3/2014 |
| CN | 103841626 A | 6/2014 |
| CN | 103916982 A | 7/2014 |
| CN | 104469789 A | 3/2015 |
| CN | 104837154 A | 8/2015 |
| EP | 2421331 A1 | 2/2012 |
| JP | 2009-088955 A | 4/2009 |
| JP | 2012227561 A | 11/2012 |
| KR | 20120088826 A | 8/2012 |
| KR | 20130080487 A | 7/2013 |
| KR | 20140057440 A | 5/2014 |
| KR | 20150006289 A | 1/2015 |
| RU | 2492597 C2 | 9/2013 |
| WO | WO2016155304 A1 | 6/2016 |

OTHER PUBLICATIONS

English version of International Search Report of PCT International Application No. PCT/CN2015/093214 dated Jan. 18, 2016, from the State Intellectual Property Office of China.

International Search Report of PCT International Application No. PCT/CN2015/093214, from the State Intellectual Property Office of China as ISA, dated Jan. 18, 2016 (4 pages).

* cited by examiner

METHODS AND APPARATUSES FOR CONTROLLING A WIRELESS ACCESS POINT

CROSS-REFERENCE TO RELATED APPLICATIONS

This application is based upon and claims priority to Chinese Patent Application No. 201510149483.6, filed Mar. 31, 2015, the entire contents of which are incorporated herein by reference.

TECHNICAL FIELD

The present disclosure generally relates to the field of smart devices, and more particularly, to methods and apparatuses for controlling a wireless access point.

BACKGROUND

With the development of smart device technologies, various kinds of smart devices have gradually become common in people's lives. A smart device includes a Wireless-Fidelity (Wi-Fi) chip, through which the smart device can access a network. A user may use a smart terminal to send control instructions to smart devices associated with the smart terminal, for example, to control household appliances remotely.

Under normal circumstances, the smart device's Wi-Fi chip is set in a monitoring mode, and in such a case, the smart device can access a network in the monitoring mode. In some special cases, for example, when the Wi-Fi chip encounters some problems and the smart device cannot access the network, it is necessary for the Wi-Fi chip to enable the function of wireless access point, thereby allowing the smart terminal to access a network provided by the Wi-Fi chip and to determine the cause of the malfunction. The Wi-Fi chip enables the function of wireless access point in such a manner: the user actuates physical buttons or keys on the body of the smart device to change the operation mode of the Wi-Fi chip to a wireless access point mode.

SUMMARY

In accordance with the present disclosure, there is provided a method for controlling a wireless access point. The method includes detecting that a control event relating to a smart device is triggered, acquiring a service set identifier (SSID) corresponding to the control event, generating a Wireless Fidelity (Wi-Fi) broadcast message according to the SSID corresponding to the control event, and broadcasting the Wi-Fi broadcast message, such that the smart device enables the wireless access point according to the Wi-Fi broadcast message.

Also in accordance with the present disclosure, there is provided a terminal including a processor and a memory for storing instructions executable by the processor. The processor is configured to detect that a control event relating to a smart device is triggered, acquire a service set identifier (SSID) corresponding to the control event, generate a Wi-Fi broadcast message according to the SSID corresponding to the control event, and broadcast the Wi-Fi broadcast message, such that the smart device enables the wireless access point according to the Wi-Fi broadcast message.

Also in accordance with the present disclosure, there is provided a non-transitory computer-readable storage medium storing instructions that, when executed by a processor of a terminal, cause the terminal to perform a method for controlling a wireless access point. The method includes detecting that a control event relating to a smart device is triggered, acquiring a service set identifier (SSID) corresponding to the control event, generating a Wireless Fidelity (Wi-Fi) broadcast message according to the SSID corresponding to the control event, and broadcasting the Wi-Fi broadcast message, such that the smart device enables the wireless access point according to the Wi-Fi broadcast message.

It shall be appreciated that the above general description and the detailed description hereinafter are only illustrative and interpretative, but not for limiting the present disclosure.

BRIEF DESCRIPTION OF THE DRAWINGS

The accompanying drawings, which are incorporated into and constitute a part of the specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
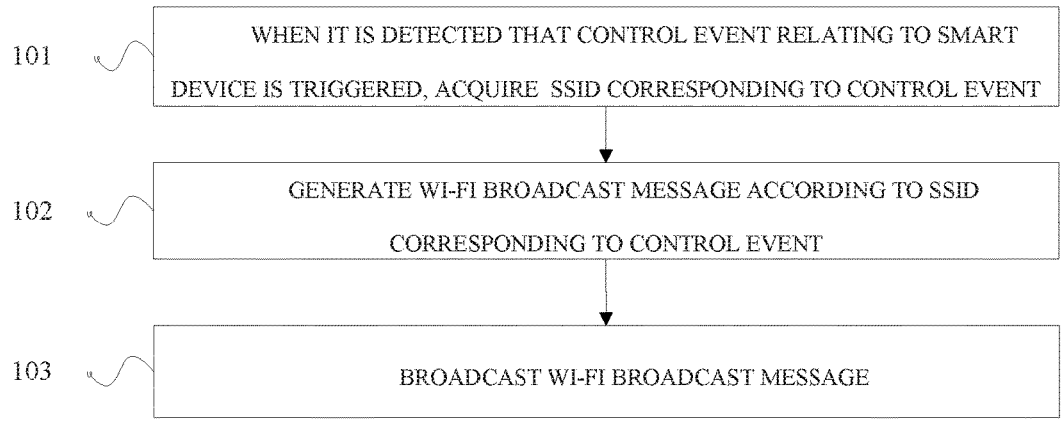
FIG. 1 is a flowchart of a method for controlling a wireless access point, according to an exemplary embodiment.

In an exemplary embodiment of the present disclosure, a method for controlling a wireless access point is provided. The method may be implemented in a terminal, which may be a mobile phone, a computing device, a digital broadcast terminal, a messaging device, a gaming console, a tablet, a medical device, exercise equipment, a personal digital assistant, or the like. Referring to FIG. 1, the method may include the following steps.

In step 101, when it is detected that a control event relating to a smart device is triggered, a service set identifier (SSID) corresponding to the control event may be acquired.

In step 102, a Wi-Fi broadcast message may be generated according to the SSID corresponding to the control event.

In step 103, the Wi-Fi broadcast message may be broadcasted, such that the smart device may enable the wireless access point according to the Wi-Fi broadcast message.

In the embodiments of the present disclosure, when the control event relating to the smart device is triggered, the Wi-Fi broadcast message is generated according to the SSID corresponding to the control event. The Wi-Fi broadcast message may be broadcasted, such that the smart device that receives the Wi-Fi broadcast message may enable its own wireless access point. As such, the operation process through which the smart device enables the wireless access point may be simplified, and the efficiency of the smart device may be improved.

Figure 2:
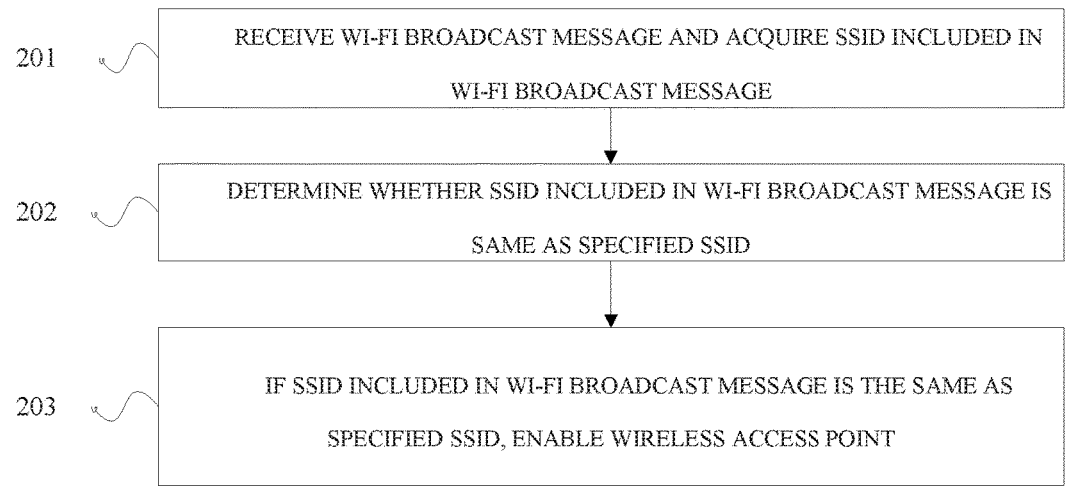
FIG. 2 is a flowchart of a method for controlling a wireless access point, according to an exemplary embodiment.

Referring to FIG. 2, in some embodiments, a method for controlling a wireless access point is provided. The method may be implemented in a smart device. In some embodiments, the smart device may be a mobile phone, a computer, a digital broadcast terminal, a messaging device, a gaming console, a tablet, a medical device, exercise equipment, a personal digital assistant, or the like. Alternatively, the smart device may be a smart router, a smart air purifier, a smart water cleaner, a smart camera, or the like.

In step 201, a Wi-Fi broadcast message may be received, and an SSID included in the Wi-Fi broadcast message may be acquired.

In step 202, it may be determined whether the SSID included in the Wi-Fi broadcast message is the same as a specified SSID.

In step 203, if the SSID included in the Wi-Fi broadcast message is the same as the specified SSID, the wireless access point may be enabled.

In the embodiments of the present disclosure, when the Wi-Fi broadcast message is received, the smart device's own wireless access point may be enabled. As such, the operation process through which the smart device enables the wireless access point may be simplified, and the efficiency of the smart device may be improved.

Figure 3:
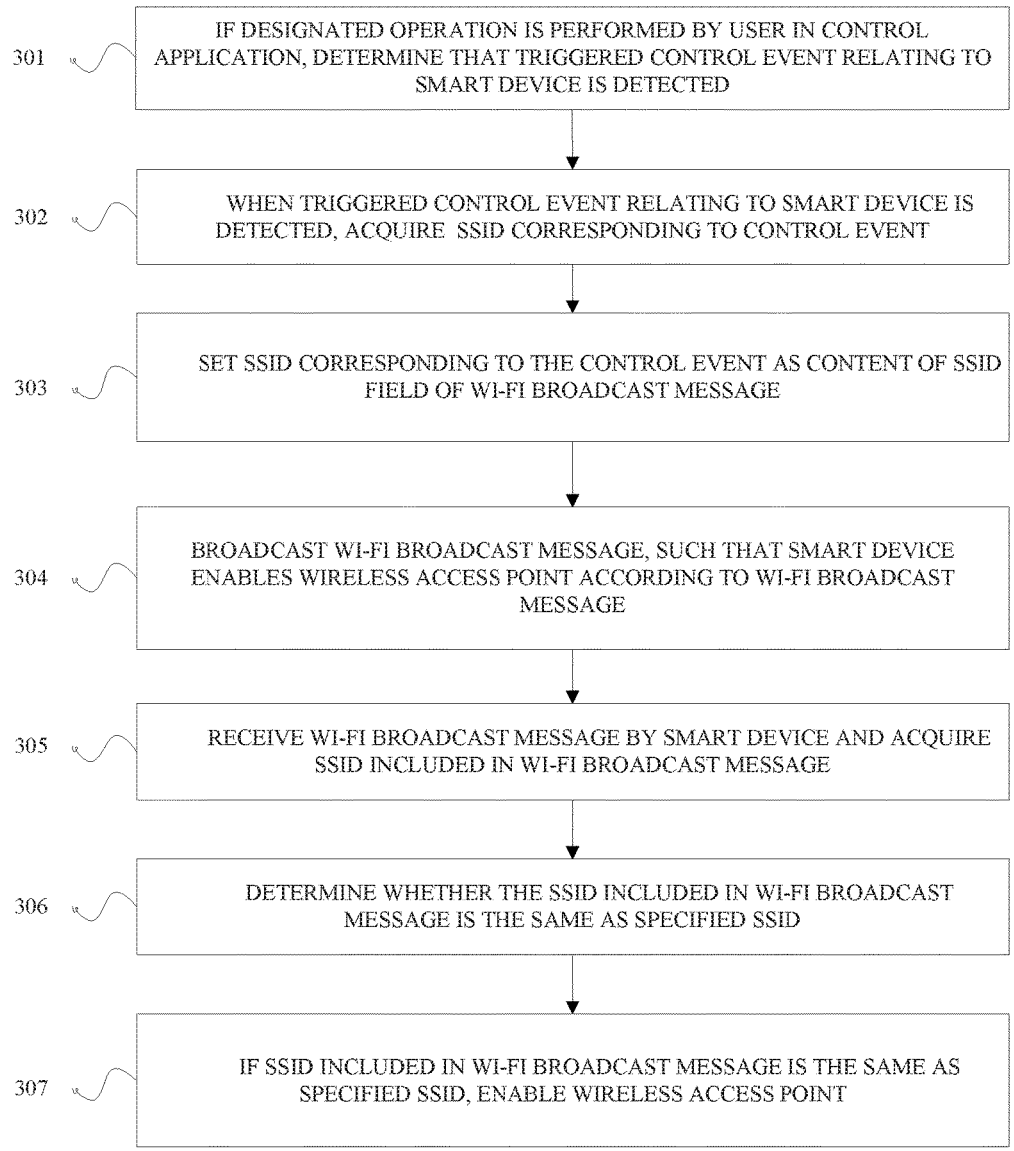
FIG. 3 is a flowchart of a method for controlling a wireless access point, according to an exemplary embodiment.

Referring to FIG. 3, in some embodiments, a method for controlling a wireless access point is provided as follows.

In step 301, if a terminal detects that a designated operation is performed by a user in a control application, it is determined that a triggered control event relating to a smart device is detected.

In some embodiments, the control application may be preinstalled in the terminal. The control application can also activate and control a Wi-Fi setting interface of the terminal and cause the terminal to transmit a Wi-Fi broadcast message.

In some embodiments, when the user needs to control the smart device to enable a wireless access point, the user may activate the control application in the terminal. The control application may then receive the designated operation performed by the user to control the terminal, and activate and control a system interface of the terminal to transmit the Wi-Fi broadcast message.

The designated operation may include, but not limited to, an operation such as clicking a control button in the control application, or the like.

In step 302, when it is detected that a control event relating to a smart device is triggered, an SSID corresponding to the control event may be acquired.

The SSID corresponding to the control event may be pre-stored in the control application. In some embodiments, the SSID may comprise English letters only, numeric characters only, or a combination of English letter(s) and numeric character(s). The SSID may be unique in order to be distinguished from SSIDs provided by other network access devices.

In step 303, the SSID corresponding to the control event may be set as content of the SSID field of the Wi-Fi broadcast message.

In some embodiments, the Wi-Fi broadcast message may be an association request message, which allows a developer to modify the content of the SSID field of the Wi-Fi broadcast message.

The content of the SSID field of the Wi-Fi broadcast message may be replaced by the SSID corresponding to the control event. If the previous content of the SSID field of the Wi-Fi broadcast message is null, the SSID corresponding to the control event may be directly written into this field.

In step 304, the Wi-Fi broadcast message may be broadcasted, such that a smart device may enable its wireless access point according to the Wi-Fi broadcast message.

The broadcasting process may be performed by invoking a specified system interface to broadcast the Wi-Fi broadcast message.

In step 305, the smart device may receive the Wi-Fi broadcast message and acquire the SSID included in the Wi-Fi broadcast message.

At this time, the Wi-Fi chip in the smart device may be in a monitoring mode, and the smart device may be configured to receive broadcast message(s) transmitted from other terminal(s) and/or network access device(s).

The process of acquiring the SSID included in the Wi-Fi broadcast message may include searching for the SSID field in the Wi-Fi broadcast message and obtaining the content of the SSID field.

In step 306, it may be determined whether the SSID included in the Wi-Fi broadcast message is the same as a specified SSID.

In some embodiments, the specified SSID may be pre-stored in a storage device included in the smart device, which may be used to identify the Wi-Fi broadcast message.

In step 307, if the SSID included in the Wi-Fi broadcast message is the same as the specified SSID, the smart device may enable its own wireless access point.

At this time, the mode of the smart device's Wi-Fi chip may be changed from the monitoring mode to a mode corresponding to the wireless access point.

In the embodiment described above, when the control event relating to the smart device is triggered, the Wi-Fi broadcast message may be generated according to the SSID corresponding to the control event. The Wi-Fi broadcast message may be broadcasted, and the smart device may receive the Wi-Fi broadcast message and enable its own wireless access point. As such, the operation process through which the smart device enables the wireless access point may be simplified, and the efficiency of the smart device may be improved.

Figure 4:
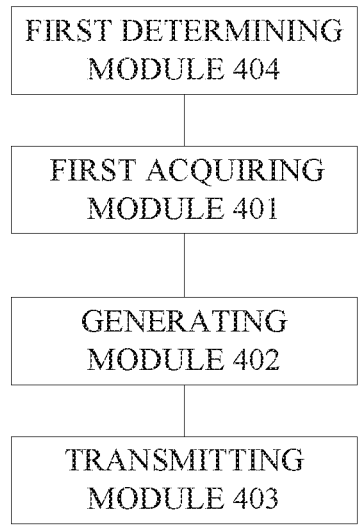
FIG. 4 is a block diagram of a device for controlling a wireless access point, according to an exemplary embodiment.

Consistent with the methods for controlling a wireless access point in the exemplary embodiments described above, another exemplary embodiment of the present disclosure provides an apparatus for controlling a wireless access point. Referring to FIG. 4, the apparatus may include: a first acquiring module 401 configured to, when detecting that a control event for a smart device is triggered, acquire an SSID corresponding to the control event; a generating module 402 configured to generate a Wi-Fi broadcast message according to the SSID corresponding to the control event; and a transmitting module 403 configured to broadcast the Wi-Fi broadcast message, such that the smart device may enable the wireless access point according to the Wi-Fi broadcast message.

In some embodiments, the generating module 402 may be further configured to: set the SSID corresponding to the control event as the content of an SSID field of the Wi-Fi broadcast message.

In some embodiments, the Wi-Fi broadcast message may be an association request message.

In some embodiments, the apparatus may further include: a first determining module 404 configured to, when a designated operation is performed by a user in a control application, determine detection of a control event relating to a smart device being triggered.

In the embodiments of the present disclosure, when the control event for the smart device is triggered, the Wi-Fi broadcast message may be generated according to the SSID corresponding to the control event, and the Wi-Fi broadcast message may be broadcasted. The smart device that receives the Wi-Fi broadcast message may enable its wireless access point. As such, the operation process through which the smart device enables the wireless access point may be simplified, and the efficiency of the smart device may be improved.

Figure 5:
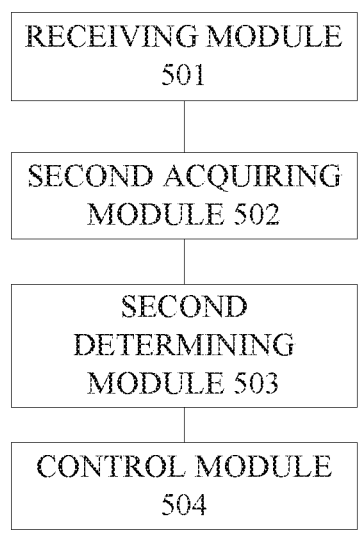
FIG. 5 is a block diagram of a device for controlling a wireless access point, according to an exemplary embodiment.

Corresponding to the methods for controlling a wireless access point as provided by the exemplary embodiments described above, another exemplary embodiment of the present disclosure provides an apparatus for controlling a wireless access point. Referring to FIG. 5, the apparatus may include: a receiving module 501 configured to receive a Wi-Fi broadcast message; a second acquiring module 502 configured to acquire an SSID included in the Wi-Fi broadcast message; a second determining module 503 configured to determine whether the SSID included in the Wi-Fi broadcast message is the same as a specified SSID; and a control module 504 configured to enable the wireless access point of the smart device, when the SSID included in the Wi-Fi broadcast message is the same as the specified SSID.

In the embodiments described above, when the Wi-Fi broadcast message is received, the smart device's wireless access point may be enabled. As such, the operation process through which the smart device enables its wireless access point may be simplified, and the efficiency of the smart device may be improved.

Figure 6:
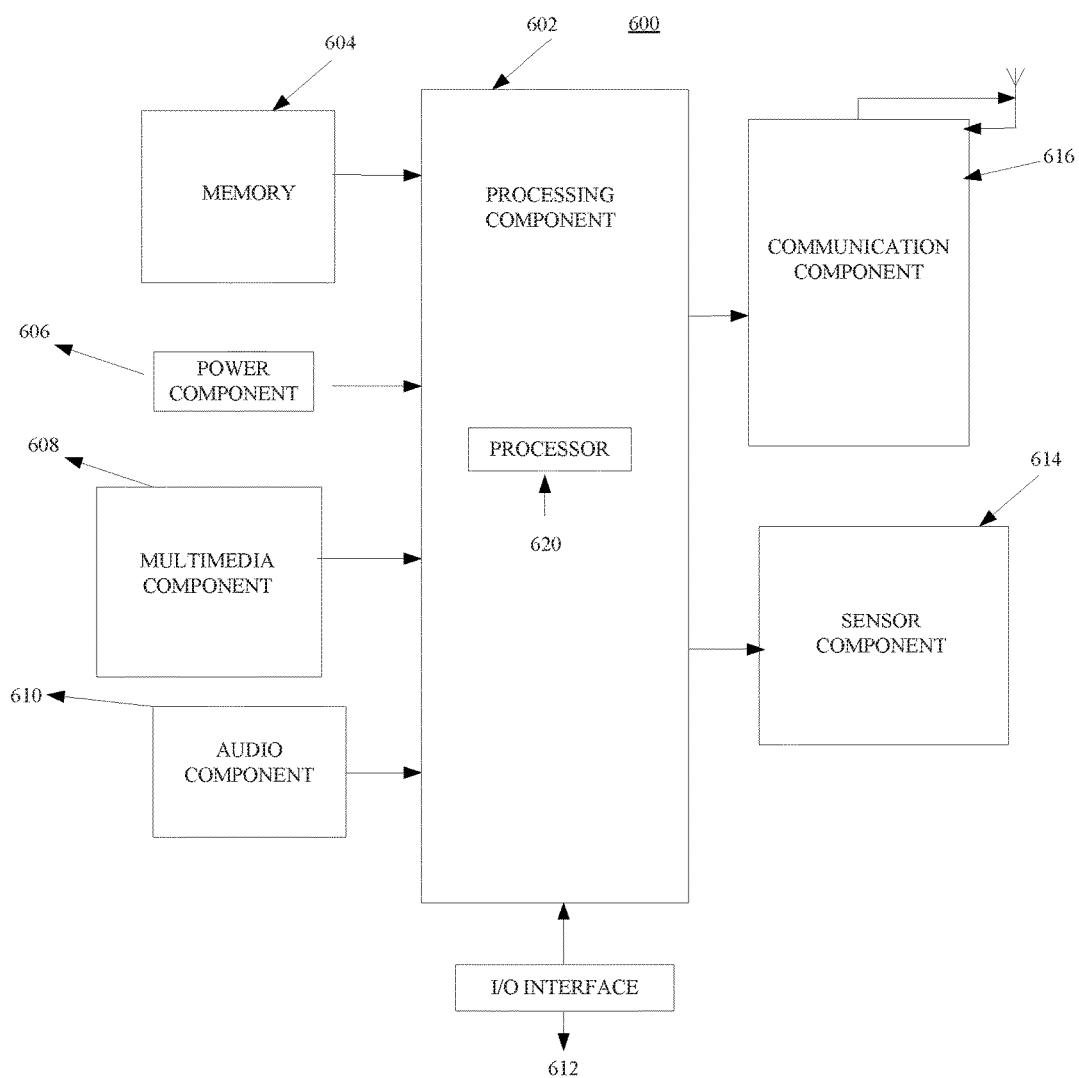
FIG. 6 is a block diagram of a terminal, according to an exemplary embodiment.

Referring to FIG. 6, consistent with the apparatus for controlling a wireless access point in the exemplary embodiments described above, another exemplary embodiment of the present disclosure provides a terminal 600. For example, terminal 600 may be a mobile phone, a computer, a digital broadcast terminal, a messaging device, a gaming console, a tablet, a medical device, an exercise equipment, a personal digital assistant, or the like.

Referring to FIG. 6, terminal 600 may include one or more of the following components: a processing component 602, a memory 604, a power component 606, a multimedia component 608, an audio component 610, an input/output (I/O) interface 612, a sensor component 614, and a communication component 616.

Processing component 602 may control overall operations of terminal 600, including, for example, the operations relating to display, telephone calls, data communications, camera operations, and/or recording operations. Processing component 602 may include one or more processors 620 to execute instructions to perform all or some of the steps in the methods described above. In addition, processing component 602 may include one or more modules that facilitate communications between processing component 602 and other components. For example, processing component 602 may include a multimedia module to facilitate the communications between the multimedia component 608 and processing component 602.

Memory 604 may be configured to store various types of data to support the operations of terminal 600. Exemplary data may include instructions for any application and/or method executed by terminal 600, contact data, phonebook data, messages, pictures, videos, and the like. Memory 604 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Power component 606 may provide power to various components of terminal 600. Power component 606 may include a power management system, one or more power supplies, and/or other components relating to the generation, management, and distribution of power in terminal 600.

Multimedia component 608 may include a screen configured to provide an output interface between terminal 600 and the user. In some embodiments, the screen may include a liquid crystal display (LCD) and a touch panel (TP). If the screen includes the touch panel, the screen may function as a touch screen configured to receive input from the user. The touch panel may include one or more touch sensors configured to sense touches, swipes, and/or gestures on the touch panel. The touch sensors may not only sense space boundaries of a touch or swipe action, but also sense a period of time and/or a pressure associated with the touch or swipe action. In some embodiments, multimedia component 608 may include a front camera and/or a rear camera. The front camera and/or the rear camera may receive external multimedia data while terminal 600 is in an operation mode, such as a photographing mode or a video mode. Each of the front camera and the rear camera may include a fixed optical lens system or have focus and optical zoom capability.

Audio component 610 may be configured to output and/or input audio signals. For example, audio component 610 may include a microphone configured to receive an external audio signal when terminal 600 is in an operation mode such as a call mode, a recording mode, or a voice recognition mode. The received audio signal may be further stored in memory 604 or transmitted via communication component 616. In some embodiments, audio component 610 may further include a speaker to output audio signals.

I/O interface 612 may provide an interface between processing component 602 and a peripheral interface module, such as a keyboard, a click wheel, a button, or the like. The button may include, but are not limited to, a home button, a volume button, a starting button, and/or a locking button.

Sensor component 614 may include one or more sensors configured to provide status assessments of various aspects of terminal 600. For example, sensor component 614 may detect an open (or closed) status of terminal 600, relative position(s) of component(s) (e.g., the display or the keypad) of terminal 600, a change in position of terminal 600 or a component thereof, a presence or absence of a user's contact with terminal 600, an orientation or an acceleration (or deceleration) of terminal 600, and/or a change in temperature of terminal 600. Sensor component 614 may also include a proximity sensor configured to detect the presence of nearby object(s) without any physical contact with such object(s). Sensor component 614 may also include a light sensor, such as a CMOS or CCD image sensor, for use in imaging applications. In some embodiments, sensor component 614 may also include an accelerometer sensor, a gyroscope sensor, a magnetic sensor, a pressure sensor, and/or a temperature sensor.

Communication component 616 may be configured to facilitate communications, wired or wirelessly, between terminal 600 and other devices. Terminal 600 may access a wireless network based on a communication standard, such as WiFi, 2G, or 3G, or a combination thereof. In some embodiments, communication component 616 may receive a broadcast signal or information relating to broadcast from an external broadcast management system via a broadcast channel. In some embodiments, communication component 616 may further include a near field communication (NFC) module configured to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

In some embodiments, terminal 600 may include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components configured to perform the above-described methods.

In some embodiments, there is also provided a non-transitory computer-readable medium storing instructions, such as the instructions included in memory 604 and executable by processor 620 of terminal 600, for performing the above-described methods. For example, the non-transitory computer-readable medium may be a ROM, a random access memory (RAM), a compact disc read-only memory (CD-ROM), a magnetic tape, a floppy disc, or an optical data storage device, or the like.

In the embodiments disclosed herein, when a control event relating to a smart device is triggered, a Wi-Fi broadcast message may be generated according to an SSID corresponding to the control event, and the Wi-Fi broadcast message may be broadcasted, such that the smart device that receives the Wi-Fi broadcast message may enable its wireless access point. As such, the operation process through which the smart device enables the wireless access point may be simplified, and the efficiency of the smart device may be improved.

Figure 7:
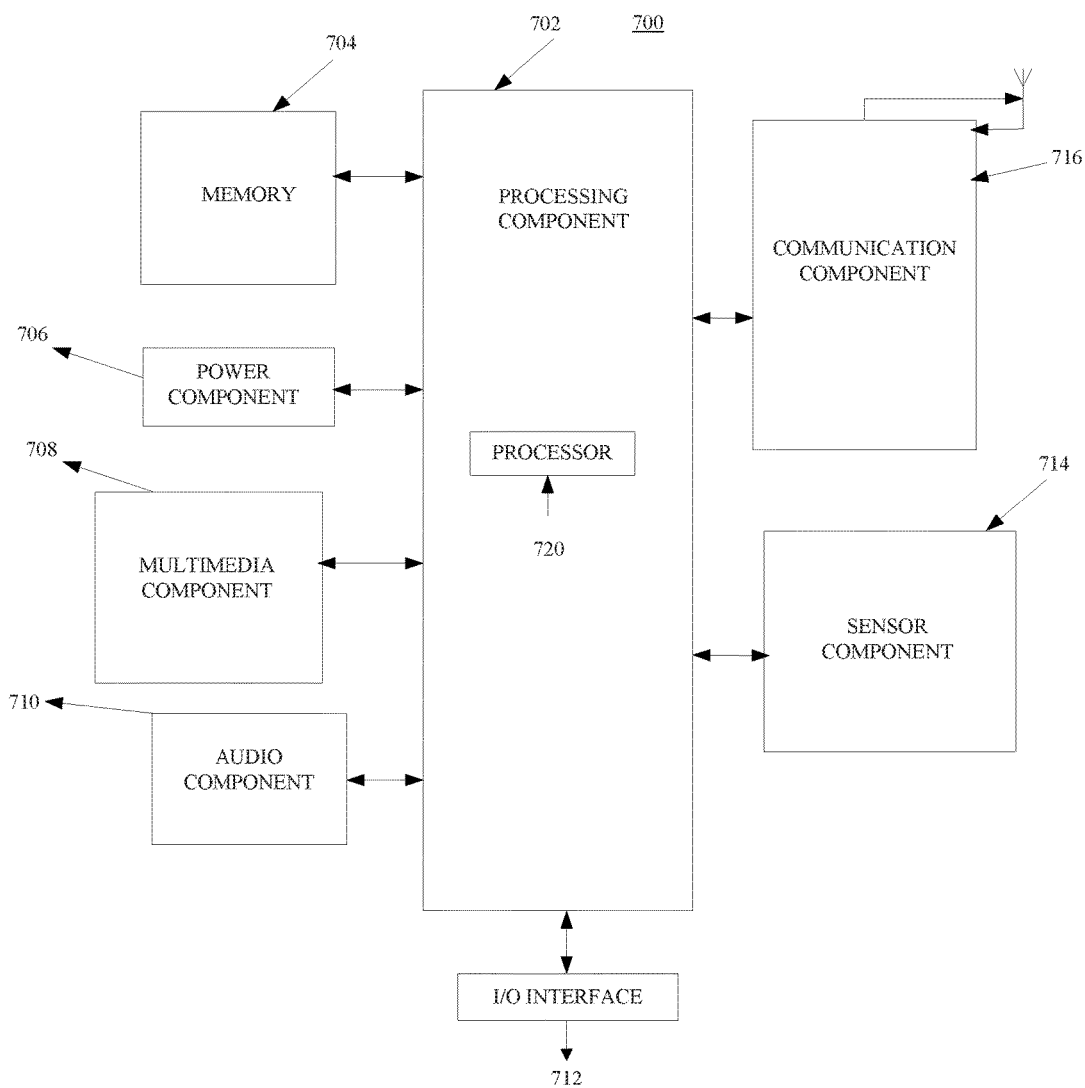
FIG. 7 is a block diagram of a smart device, according to an exemplary embodiment.

Referring to FIG. 7, consistent with the apparatus for controlling a wireless access point described in the exemplary embodiments disclosed above, another exemplary embodiment of the present disclosure provides a smart device 700. For example, smart device 700 may be a mobile phone, a computer, a digital broadcast terminal, a messaging device, a gaming console, a tablet, a medical device, exercise equipment, a personal digital assistant, or a smart device, or the like. Alternatively, smart device 700 may be a smart router, a smart air purifier, a smart water cleaner, or a smart camera, or the like.

Referring to FIG. 7, smart device 700 may include one or more of the following components: a processing component 702, a memory 704, a power component 706, a multimedia component 708, an audio component 710, an input/output (I/O) interface 712, a sensor component 714, and a communication component 716.

Processing component 702 typically controls overall operations of smart device 700, such as the operations relating to displaying, telephone calls, data communications, camera operations, and/or recording operations. Processing component 702 may include one or more processors 720 to execute instructions to perform all or some of the steps in the above-described methods. In addition, processing component 702 may include one or more modules that facilitate the interactions between processing component 702 and other components. For example, processing component 702 may include a multimedia module configured to facilitate the interactions between multimedia component 708 and processing component 702.

Memory 704 may be configured to store various types of data to support the operations of smart device 700. Exemplary data may include instructions for any applications or methods operated on smart device 700, contact data, phonebook data, messages, pictures, videos, and/or the like. Memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and/or a magnetic or optical disk.

Power component 706 may provide power to various components of smart device 700. Power component 706 may include a power management system, one or more power supplies, and other components relating to generation, management, and distribution of power in smart device 700.

Multimedia component 708 may include a screen providing an output interface between smart device 700 and the user. In some embodiments, the screen may include a liquid crystal display (LCD) and a touch panel (TP). If the screen includes the touch panel, the screen may function as a touch screen configured to receive input signals from the user. The touch panel may include one or more touch sensors configured to sense touches, swipes, and/or gestures on the touch panel. The touch sensor(s) may not only sense space boundaries of a touch or swipe action, but also sense a period of time and a pressure associated with the touch or swipe action. In some embodiments, multimedia component 708 may include a front camera and/or a rear camera. The front camera and/or the rear camera may receive external multimedia data while smart device 700 is in an operation mode, such as a photographing mode or a video mode. Each of the front camera and the rear camera may include a fixed optical lens system or have focus and optical zoom capability.

Audio component 710 may be configured to output and/or input audio signals. For example, audio component 710 may include a microphone configured to receive an external audio signal when smart device 700 is in an operation mode, such as a call mode, a recording mode, or a voice recognition mode. The received audio signal may be further stored in memory 704 or transmitted via communication component 716. In some embodiments, audio component 710 may further include a speaker to output audio signals.

I/O interface 712 may provide an interface between processing component 702 and a peripheral interface module, such as a keyboard, a click wheel, or a button, or the like. The button(s) may include, but is not limited to, a home button, a volume button, a starting button, and/or a locking button.

Sensor component 714 may include one or more sensors configured to provide status assessments of various aspects of smart device 700. For example, sensor component 714 may detect an open/closed status of smart device 700, relative positions of components (e.g., the display and the keypad) of smart device 700, a change in position of smart device 700 or a component thereof, a presence or absence of the user's contact with smart device 700, an orientation or an acceleration/deceleration of smart device 700, and/or a change in temperature of smart device 700. Sensor component 714 may include a proximity sensor configured to detect the presence of nearby object(s) without any physical contact with such object(s). Sensor component 714 may also include a light sensor, such as a CMOS or CCD image sensor, for use in imaging applications. In some embodiments, sensor component 714 may also include an accelerometer sensor, a gyroscope sensor, a magnetic sensor, a pressure sensor, and/or a temperature sensor.

Communication component 716 may be configured to facilitate communications, wired or wirelessly, between smart device 700 and other devices. Smart device 700 may access a wireless network based on a communication standard, such as WiFi, 2G, or 3G, or a combination thereof. In one exemplary embodiment, communication component 716 may receive a broadcast signal or information relating to broadcast from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and/or other technologies.

In some embodiments, smart device 700 may include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above-described methods.

In some embodiments, there is also provided a non-transitory computer-readable storage medium storing instructions, such as the instructions included in memory 704 and executable by processor 720 in smart device 700, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

In the embodiments disclosed herein, when a Wi-Fi broadcast message is received, the smart device's own wireless access point may be enabled. As such, the operation process through which the smart device enables the wireless access point may be simplified, and the efficiency of the smart device may be improved.

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules may be further divided into a plurality of sub-modules.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings and that various modifications and changes can be made without departing from the scope of the present disclosure. The scope of the present disclosure may only be limited by the appended claims.

What is claimed is:

1. A method for controlling a wireless access point of a smart device, the method comprising:
   detecting, by a terminal, that a control event relating to the smart device is triggered;
   acquiring, by the terminal, a service set identifier (SSID) corresponding to the control event;
   generating, by the terminal, a Wireless Fidelity (Wi-Fi) broadcast message according to the SSID corresponding to the control event; and
   broadcasting, by the terminal, the Wi-Fi broadcast message, wherein the smart device receives the Wi-Fi broadcast message and enables the wireless access point of the smart device according to the Wi-Fi broadcast message.

2. The method of claim 1, wherein generating the Wi-Fi broadcast message according to the SSID corresponding to the control event comprises setting the SSID corresponding to the control event as content of an SSID field of the Wi-Fi broadcast message.

3. The method of claim 1, wherein the Wi-Fi broadcast message is an association request message.

4. The method of claim 1, wherein prior to acquiring the SSID corresponding to the control event, the method further comprises:
   if a designated operation is performed by a user in a control application, determining that the triggered control event relating to the smart device is detected.

5. A terminal, comprising:
   a processor; and
   a memory for storing instructions executable by the processor;
   wherein the processor is configured to:
   detect that a control event relating to a smart device is triggered;
   acquire a service set identifier (SSID) corresponding to the control event;
   generate a Wi-Fi broadcast message according to the SSID corresponding to the control event; and
   broadcast the Wi-Fi broadcast message, wherein the smart device receives the Wi-Fi broadcast message and enables the wireless access point of the smart device according to the Wi-Fi broadcast message.

6. The terminal of claim 5, wherein the processor is further configured to set the SSID corresponding to the control event as content of an SSID field of the Wi-Fi broadcast message.

7. The terminal of claim 5, wherein the Wi-Fi broadcast message is an association request message.

8. The terminal of claim 5, wherein the processor is further configured to determine, prior to acquiring the SSID corresponding to the control event, that the triggered control event relating to the smart device is detected if a designated operation is performed by a user in a control application.

9. A non-transitory computer-readable storage medium storing instructions that, when executed by a processor of a terminal, cause the terminal to perform a method for controlling a wireless access point of a smart device, the method comprising:
- detecting, by the terminal, that a control event relating to the smart device is triggered;
- acquiring, by the terminal, a service set identifier (SSID) corresponding to the control event;
- generating, by the terminal, a Wireless Fidelity (Wi-Fi) broadcast message according to the SSID corresponding to the control event; and
- broadcasting, by the terminal, the Wi-Fi broadcast message, wherein the smart device receives the Wi-Fi broadcast message and enables the wireless access point of the smart device according to the Wi-Fi broadcast message.

* * * * *